US012755509B2

(12) United States Patent
Gao et al.

(10) Patent No.: US 12,755,509 B2
(45) Date of Patent: Oct. 6, 2026

(54) COMPRESSED SPATIAL FREQUENCY TRANSFORM FOR FEATURE TRACKING, IMAGE MATCHING, SEARCH, AND RETRIEVAL

(71) Applicant: THE CURATORS OF THE UNIVERSITY OF MISSOURI, Columbia, MO (US)

(72) Inventors: Ke Gao, Columbia, MO (US); Hadi Ali Akbarpour, Columbia, MO (US); Kannappan Palaniappan, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 425 days.

(21) Appl. No.: 18/300,182

(22) Filed: Apr. 13, 2023

(65) Prior Publication Data

US 2023/0334821 A1 Oct. 19, 2023

Related U.S. Application Data

(60) Provisional application No. 63/330,633, filed on Apr. 13, 2022.

(51) Int. Cl.
*G06V 10/75* (2022.01)
*G06V 10/25* (2022.01)

(52) U.S. Cl.
CPC ............ *G06V 10/753* (2022.01); *G06V 10/25* (2022.01)

(58) Field of Classification Search
USPC .......................................................... 382/181
See application file for complete search history.

(56) References Cited

U.S. PATENT DOCUMENTS

2010/0094622 A1* 4/2010 Cardillo .................. G10L 15/02 704/224
2011/0052029 A1* 3/2011 Connah ..................... G06T 5/50 382/164

(Continued)

OTHER PUBLICATIONS

Moreno-Noguer (F. Moreno-Noguer, "Deformation and illumination invariant feature point descriptor," CVPR 2011, Colorado Springs, CO, USA, 2011, pp. 1593-1600, doi: 10.1109/CVPR.2011.5995529) (Year: 2011).*

(Continued)

*Primary Examiner* — Chineyere Wills-Burns
*Assistant Examiner* — Aaron Timothy Bonansinga
(74) *Attorney, Agent, or Firm* — Shook, Hardy & Bacon, LLP

(57) ABSTRACT

A method for feature tracking, image matching, using key point detection and a unique approach for associated key patch frequency domain descriptors. The system includes at least one processor and one or more computer storage media storing computer executable instructions that, when executed by the processor, cause the system to perform various operations. In particular, the system identifies a plurality of patches from a first image, detects one or more key points and associated patches from the plurality of patches, generates a set of transformed patches by transforming the key patches from the spatial domain to the frequency domain using a Discrete Cosine Transform or Discrete Fourier transform, encodes a set of illumination, rotational, scale and other geometric transformations of the transformed patches into a frequency descriptor, and matches a second image to the first image using the descriptors.

20 Claims, 8 Drawing Sheets

(56) References Cited

U.S. PATENT DOCUMENTS

| | | | | |
|---|---|---|---|---|
| 2011/0206119 | A1* | 8/2011 | Bivolarsky | H04N 19/547 375/240.12 |
| 2011/0255781 | A1* | 10/2011 | Hamsici | G06V 10/462 382/170 |
| 2011/0299770 | A1* | 12/2011 | Vaddadi | G06V 10/757 382/165 |
| 2012/0201466 | A1* | 8/2012 | Funayama | G06V 10/462 382/195 |
| 2013/0216097 | A1* | 8/2013 | Pau | G06V 10/50 382/103 |
| 2018/0075605 | A1* | 3/2018 | Jia | G06V 10/28 |
| 2018/0239952 | A1* | 8/2018 | Rijnders | G06V 10/431 |
| 2018/0268256 | A1* | 9/2018 | Di Febbo | G06V 10/82 |
| 2020/0050880 | A1* | 2/2020 | Pope | H04N 25/61 |
| 2020/0351520 | A1* | 11/2020 | Fischbacher | H04N 19/105 |
| 2021/0217129 | A1* | 7/2021 | Deshmukh | G06T 1/005 |
| 2021/0329249 | A1* | 10/2021 | Koo | H04N 19/12 |
| 2022/0187841 | A1* | 6/2022 | Ebrahimi Afrouzi | G05D 1/0272 |
| 2022/0261567 | A1* | 8/2022 | Rodriguez | G06V 20/63 |

OTHER PUBLICATIONS

Li et al. (Xiaoyang Li et al., "RISAS: A Novel Rotation, Illumination, Scale Invariant Appearance and Shape Feature", Mar. 2016, arXiv:1603.04134v1) (Year: 2016).*

Widya, A., R., et al., "Structure from motion using dense CNN features with keypoint relocalization", IPSJ Transactions on Computer Vision and Applications, Springer, vol. 10, No. 6, pp. 1-7 (2018).

Zagoruyko, S., and Komodakis, N., "Learning to Compare Image Patches via Convolutional Neural Networks", 2015 IEEE Conference on Computer Vision and Pattern Recognition (CVPR), pp. 4353-4361 (2015).

Zhong, D., and Defee, I., "DCT histogram optimization for image database retrieval", Pattern Recognition Letters, Science Direct, vol. 26, pp. 2272-2281 (2005).

Alcantarilla, P., F., et al., "Fast Explicit Diffusion for Accelerated Features in Nonlinear Scale Spaces", Proceedings of the British Machine Vision Conference, Conference Paper, pp. 1-12 (Sep. 2013).

Aliakbarpour, H., et al., "Robust Camera Pose Refinement and Rapid SfM for Multiview Aerial Imagery—Without RANSAC", IEEE Geoscience and Remote Sensing Letters, vol. 12, No. 11, pp. 2203-2207 (Nov. 2015).

Aliakbarpour, H., et al., "Parallax-Tolerant Aerial Image Georegistration and Efficient Camera Pose Refinement—Without Piecewise Homographies", IEEE Transactions on Geoscience and Remote Sensing, vol. 55, No. 8, pp. 4618-4637 (Aug. 2017).

Aliakbarpour, H., et al., "Stabilization of Airborne Video Using Sensor Exterior Orientation with Analytical Homography Modeling", Chapter 17, Machine Vision and Navigation, Springer Nature Switzerland AG, pp. 579-595 (2020).

Aslan, S., et al., "A DCT-based multiscale binary descriptor robust to complex brightness changes", In proceedings of the 24th European Signal Processing Conference (EUSIPCO), IEEE, pp. 1573-1577 (2016).

Balntas, V., et al., "Learning local feature descriptors with triplets and shallow convolutional neural networks", British Machine Vision Conference 2016, pp. 1-11 (2016).

Bay, H., et al., "SURF: Speeded Up Robust Features", Part I, ECCV, Part of the Lecture Notes in Computer Science book series (LNCS), vol. 3951, Springer, pp. 404-417 (2006).

Bunyak, F., et al., "Flux Tensor Constrained Geodesic Active Contours with Sensor Fusion for Persistent Object Tracking", In the Proceedings of the 8th IEEE Workshop on Applications of Computer Vision (WACV), vol. 2, No. 4, pp. 1-32 (2007).

Choy, C., B., et al., "Universal Correspondence Network", arXiv:1606.03558v3, pp. 1-17 (Oct. 31, 2016).

Detone, D., et al., "SuperPoint: Self-Supervised Interest Point Detection and Description", arXiv:1712.07629v4, pp. 1-13 (Apr. 19, 2018).

Dong, J., and Soatto, S., "Domain-Size Pooling in Local Descriptors: DSP-SIFT", arXiv:1412.8556v3, pp. 1-18 (May 5, 2015).

Feng, G., and Jiang, J., "JPEG compressed image retrieval via statistical features", Pattern Recognition, vol. 36, pp. 977-985 (2003).

Gao, K., et al., "Local Feature Performance Evaluation for Structure-From-Motion and Multi-View Stereo Using Simulated City-Scale Aerial Imagery", IEEE Sensors Journal, vol. 21, No. 10, pp. 11615-11627 (May 15, 2021).

Gao, K., et al., "DCT-Based Local Descriptor for Robust Matching and Feature Tracking in Wide Area Motion Imagery", IEEE Geoscience and Remote Sensing Letters, vol. 18, No. 8, pp. 1441-1445 (Aug. 2021).

Heinly, J., et al., "Comparative Evaluation of Binary Features", Part II, ECCV, Part of the Lecture Notes in Computer Science book series (LNCS), vol. 7573, Springer, pp. 759-773 (2012).

Hofer, M., et al., "Line3D: Efficient 3D Scene Abstraction for the Built Environment", Part of the Lecture Notes in Computer Science book series (LNCS), vol. 9358, pp. 1-12 (Oct. 2015).

Jin, Y., et al., "Image Matching Across Wide Baselines: From Paper to Practice", arXiv:2003.01587v5, pp. 1-27 (Feb. 11, 2021).

Kim, S., et al., "Bi-DCT: DCT-based Local Binary Descriptor for Dense Stereo Matching", IEEE Signal Processing Letters, vol. 22, No. 7, pp. 847-851 (Jul. 2015).

Leng, C., et al., "Local Feature Descriptor for Image Matching: A Survey", IEEE Access, vol. 7, pp. 6424-6434 (2019).

Leutenegger, S., et al., "BRISK: Binary Robust Invariant Scalable Keypoints", In IEEE International Conference on Computer Vision, pp. 2548-2555 (2011).

Lowe, D., G., "Distinctive Image Features from Scale-Invariant Keypoints", International Journal of Computer Vision, pp. 1-28 (Jan. 5, 2004).

Micusik, B., and Wildenauer, H., "Descriptor Free Visual Indoor Localization with Line Segments", 2015 IEEE Conference on Computer Vision and Pattern Recognition (CVPR), pp. 3165-3173 (2015).

Micusik, B., et al., "Detection and Matching of Rectilinear Structures", Proceedings / CVPR, IEEE Computer Society Conference on Computer Vision and Pattern Recognition, IEEE Computer Society Conference on Computer Vision and Pattern Recognition, pp. 1-7 (2008).

Mikolajczyk, K., and Schmid, C., "A Performance Evaluation of Local Descriptors", IEEE Transactions on Pattern Analysis and Machine Intelligence, vol. 27, No. 10, pp. 1615-1630 (Oct. 2005).

Mishkin, D., et al., "MODS: Fast and Robust Method for Two-View Matching", arXiv:1503.02619v2, pp. 1-29 (May 1, 2016).

Morel, J., M., and Yu, G., "ASIFT: A New Framework for Fully Affine Invariant Image Comparison", Society for Industrial and Applied Mathematics, Siam J. Imaging Sciences, vol. 2, No. 2, pp. 438-469 (2009).

Mur-Artal, R., et al., "ORB-SLAM: A Versatile and Accurate Monocular SLAM System", IEEE Transactions on Robotics, vol. 31, No. 5, pp. 1147-1163 (Oct. 2015).

Ngo, C., W., et al., "Exploiting image indexing techniques in DCT domain", Pattern Recognition, vol. 34, pp. 1841-1851 (2001).

Nilosek, D., et al., "Assessing geoaccuracy of structure from motion point clouds from longrange image collections", Optical Engineering, vol. 53, No. 11, pp. 113112-1-113112-10 (Nov. 2014).

Obdrzalek, S., and Matas, J., "Image Retrieval Using Local Compact DCT-Based Representation", Part of the Lecture Notes in Computer Science book series (LNCS), vol. 2781, Springer, pp. 490-497 (2003).

Obdrzalek, S., and Matas, J., "Object Recognition Using Local Affine Frames on Maximally Stable Extremal Regions", Part of the Lecture Notes in Computer Science book series (LNCS), vol. 4170, Springer, pp. 83-104 (2006).

Oliva, A., and Torralba, A., "Modeling the Shape of the Scene: A Holistic Representation of the Spatial Envelope", International Journal of Computer Vision, vol. 42, No. 3, pp. 145-175 (2001).

(56) References Cited

OTHER PUBLICATIONS

Ono, Y., et al., "LF-Net: Learning Local Features from Images", 32nd Conference on Neural Information Processing Systems (NIPS), arXiv:1805.09662v2, pp. 1-13 (Nov. 22, 2018).
Palaniappan, K., et al., "Wide-Area Persistent Airborne Video: Architecture and Challenges", Chapter 24, Distributed Video Sensor Networks, Springer, pp. 349-371 (2011).
Porter, R., et al., "Wide-Area Motion Imagery", Digital Object Identifier, IEEE Signal Processing Magazine, pp. 1-10 (2010).
Revaud, J., et al., "DeepMatching: Hierarchical Deformable Dense Matching", Int J Comput Vis, Springer, vol. 120, pp. 300-323 (2016).
Rosten, E., and Drummond, T., "Machine Learning for High-Speed Corner Detection", Part I, ECCV, LNCS, Springer, pp. 430-443 (2006).
Rublee, E., et al., "ORB: an efficient alternative to SIFT or SURF", In IEEE International Conference on Computer Vision, pp. 2564-2571 (2011).
Sarlin, P., E., et al., "SuperGlue: Learning Feature Matching with Graph Neural Networks", In IEEE/CVF Conference on Computer Vision and Pattern Recognition (CVPR), pp. 4937-4946 (2020).
Savinov, N., et al., "Quad-networks: unsupervised learning to rank for interest point detection", In IEEE Conference on Computer Vision and Pattern Recognition, pp. 3929-3937 (2017).
Schmid, C., et al., "Evaluation of Interest Point Detectors", In International Journal of Computer Vision, vol. 37, No. 2, pp. 151-172 (2000).
Schonberger, J., L., et al., "Structure-from-Motion Revisited", In IEEE Conference on Computer Vision and Pattern Recognition, pp. 4104-4113 (2016).
Schonberger, J., L., et al., "Comparative Evaluation of Hand-Crafted and Learned Local Features", In IEEE Conference on Computer Vision and Pattern Recognition, pp. 6959-6968 (2017).
Schonberger, J., L., et al., "Pixelwise View Selection for Unstructured Multi-View Stereo", Part III, ECCV, LNCS, vol. 9907, Springer, pp. 501-518 (2016).
Simo-Serra, E., et al., "Discriminative Learning of Deep Convolutional Feature Point Descriptors", In IEEE International Conference on Computer Vision, pp. 118-126 (2015).
Song, T., and Li, H., "Local Polar DCT Features for Image Description", In IEEE Signal Processing Letters, vol. 20, No. 1, pp. 59-62 (Jan. 2013).
Tian, Y., et al., "L2-Net: Deep Learning of Discriminative Patch Descriptor in Euclidean Space", In IEEE Conference on Computer Vision and Pattern Recognition, pp. 6128-6136 (2017).
Tsai, T., et al., "Image Retrieval Based on Dominant Texture Features", IEEE ISIE, pp. 441-446 (Jul. 2006).
Verdie, Y., et al., "TILDE: A Temporally Invariant Learned Detector", 2015 IEEE Conference on Computer Vision and Pattern Recognition (CVPR), pp. 5279-5288 (2015).
Wang, Y., et al., "DCT Inspired Feature Transform for Image Retrieval and Reconstruction", In IEEE Transactions on Image Processing, vol. 25, No. 9, pp. 4406-4420 (Sep. 2016).

* cited by examiner

COMPRESSED SPATIAL FREQUENCY TRANSFORM FOR FEATURE TRACKING, IMAGE MATCHING, SEARCH, AND RETRIEVAL

STATEMENT REGARDING FEDERALLY SPONSORED RESEARCH OR DEVELOPMENT

This invention was made with government support under W911NF-18-2-0285, and W911NF-19-1-0181 awarded by the Army Research Laboratory-Army Research Office. The government has certain rights in the invention.

BACKGROUND

Image matching and vision refers to the ability of a machine or computer to interpret and analyze visual information, such as images or videos. It involves using algorithms and techniques to recognize patterns, objects, and features within visual data. The vast majority of image features used in computer vision applications are spatial domain operators and typically local in the kernel size. Compressed Spatial Frequency Transform (CSFT) operates in Fourier frequency domain to use a combination of spatial and frequency domain features that are distinctive from all other approaches for image recognition, matching, and retrieval operations.

SUMMARY

At a high level, aspects described herein relate to a system and method for image matching using Compressed Spatial Frequency Transform (CSFT) descriptors which extends the discrete cosine transform feature (DCTF) descriptors. The system includes at least one processor and one or more computer storage media storing computer executable instructions that, when executed by the processor, cause the system to perform various operations. In particular, the system identifies a plurality of key points and associated patches from a first image, detects one or more key points and associated patches from the plurality of patches, generates a set of transformed patches by transforming the key point patches from the spatial domain to the frequency domain using a Discrete Cosine Transform or Discrete Fourier Transform, encodes a set of illumination, rotational, scale and other geometric transformations of the transformed patches into a CSFT or DCTF descriptor, and matches a second image to the first image using the CSFT or DCTF descriptors.

The method of the present invention involves the same steps as the system and can be implemented using computer-executable instructions. In particular, the method involves identifying a plurality of patches from a first image, detecting one or more key points and associated patches from the plurality of patches, generating a set of transformed patches by transforming the key points and associated patches from the spatial domain to the frequency domain using a Discrete Cosine Transform or Discrete Fourier Transform, encoding a set of illumination, rotational, scale and other geometric transformations of the transformed patches into a CSFT or DCTF descriptor, and matching a second image to the first image using the CSFT or DCTF descriptor.

This summary is intended to introduce a selection of concepts in a simplified form that is further described in the Detailed Description section of this disclosure. The Summary is not intended to identify key or essential features of the claimed subject matter, nor is it intended to be an aid in determining the scope of the claimed subject matter. Additional objects, advantages, and novel features of the technology will be set forth in part in the description that follows, and in part will become apparent to those skilled in the art upon examination of the disclosure or learned through practice of the technology.

BRIEF DESCRIPTION OF THE DRAWINGS

The present technology is described in detail below with reference to the attached drawing figures, wherein.

DETAILED DESCRIPTION

Figure 1:
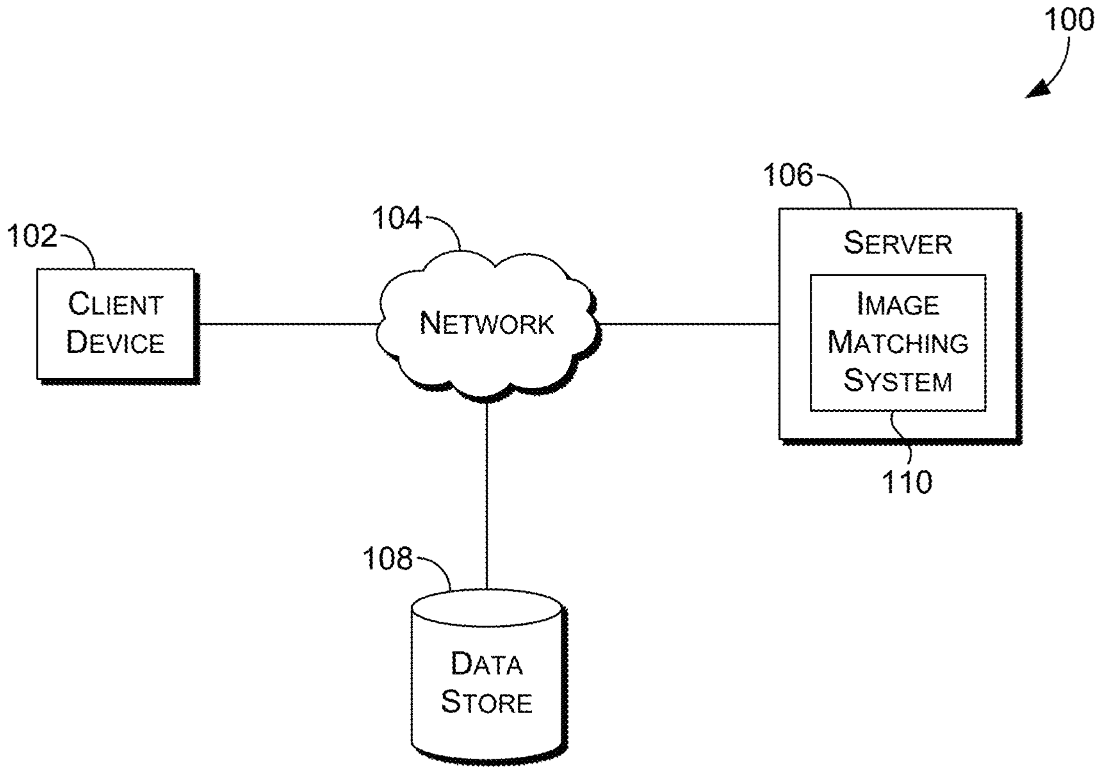
FIG. 1 is a block diagram of an example operating environment suitable for employing a image matching system, in accordance with an aspect described herein.

Establishing feature correspondences across image sequences is widely used in many computer vision tasks including image retrieval, camera pose estimation, Bundle Adjustment (BA), Structure-from-Motion (SfM), simultaneous localization and mapping (SLAM), video summarization, and object tracking. Local feature matching pipeline consists of three primary components—feature or keypoint detection, feature descriptor representation, and descriptor matching. Local distinctive and discriminative features are often extracted by a feature detector and can be points, lines, or regions. A feature descriptor is an encoder that captures the neighborhood properties around a keypoint and maps it to a distinctive high-dimensional vector by using this neighborhood structure. The distances between the reference feature descriptor and matching candidate descriptors in the target image are analyzed using different metrics to determine the best match. Traditional features for image matching embedded within the vision application pipeline with properly optimized parameters still outperform the perceived state-of-the-art deep feature networks.

The broad need for good feature matching performance has led to research work in feature detection and description. Scale-invariant feature transform (SIFT) has proved one of the best-performing algorithms for its invariance to scale and rotation. Speeded Up Robust Feature (SURF) was developed based on SIFT but performs better in terms of localization accuracy and speed. However, the high speed performance is achieved by compromising matching accuracy and robustness of binary descriptors. All of the aforementioned feature matching algorithms achieve scale and rotation invariance by identifying the scale and dominant orientation(s) of a keypoint during the feature detection phase. This requirement makes it difficult to use a simple feature detector e.g., features from accelerated segment test (FAST), which does not provide any knowledge about scale and orientation. Recently, many deep learning approaches have been developed by using convolutional neural networks to improve the feature matching performance. Deep learning approaches require a large amount of training data but the data availability may be sparse or noisy in some domains such as city-scale aerial video under obscuration and weather. Besides, neural networks are specifically formulated for particular problems and retraining may be needed to adapt to a new domain or new data. Deep learning based models normally provide superior performances only if they go through proper training, which is computationally expensive.

In computer vision tasks, such as Bundle Adjustment (BA) and Structure-from-Motion (SfM), having a long feature connectivity (i.e. long tracks) across frames or long range connections between distant (in time or space) frames (i.e. loop closures) can substantially improve the quality of the results by enforcing global consistency between more views. However, accurate feature detection and matching is difficult for some datasets such as aerial video due to oblique viewing angles, foreshortening effects, and parallax induced perspective shape distortions. Another challenge in urban scenes is to match thousands of similar/repetitive objects and textures like windows, roads, roof tiles, etc. from arbitrary viewpoints with sub-pixel accuracy. This remains an outstanding computer vision problem for critical applications like SfM and scene perception for autonomous air or ground vehicle navigation.

The system and method for image matching using the CSFT descriptor addresses the above mentioned limitations in the current technology. One of the main challenges in image matching is achieving robustness to illumination, scale, rotation, and perspective variations. Traditional image descriptors, such as SIFT and SURF, are illumination, scale-invariant and rotation-invariant but not perspective invariant. The CSFT descriptor overcomes this limitation by encoding illumination, scale, rotation and more general geometric invariance into the descriptor, resulting in a more robust and discriminative representation of the key feature points.

Another issue in the state of the art of image matching is the computational complexity of the matching algorithm, particularly for large-scale image databases. The CSFT descriptor addresses this issue by providing a compact representation of the image that can be computed efficiently using the discrete cosine transform. The matching algorithm can then be performed by computing the distance between the CSFT descriptors of the patches from the first and second images, which is a simple and efficient operation.

In addition, the CSFT descriptor provides a compressed representation of the image that can be easily stored and transmitted over networks, making it well-suited for applications such as image retrieval and video tracking. The CSFT key point and patch descriptor also reduces the dimensionality of the feature descriptor, further improving its efficiency and discriminative power.

Overall, the system and method for image matching using the CSFT descriptor represents a significant improvement over the state of the art of image matching. It overcomes the limitations of traditional descriptors by encoding both scale and rotation transformations into the descriptor, while also providing a compact and efficient representation of the image. These features make it well-suited for large-scale image databases and a wide range of applications, such as object recognition, image retrieval, and video tracking.

To address these challenges, the technology described herein provides a novel Compressed Spatial Frequency Transform (CSFT) feature that is invariant to geometric and photometric transformations without explicitly estimating the scale and dominant orientation(s) of the detected keypoints, based on a discrete cosine transform feature (DCTF). The CSFT descriptor can be used in combination with any feature detector in addition to the proposed multi-scale Hessian-based detector and provides persistent matching performance over a long sequence of images. The present technology derives an invariant feature descriptor using the Discrete Cosine Transform (DCT) coefficients and their geometric transformation properties. The technology can be efficiently implemented for real world applications. CSFT is domain independent and does not require laborious training compared to current deep learning approaches.

The present technology provides a system and method for feature tracking, image matching, searching and retrieval using CSFT or DCTF descriptors. The system includes at least one processor and one or more computer storage media storing computer executable instructions that, when executed by the processor, cause the system to perform various operations. In particular, the system identifies a plurality of key points and associated patches from a first image, detects one or more key points and associated patches from the plurality of patches, generates a set of transformed patches by transforming the key points and associated patches from the spatial domain to the frequency domain using a Discrete Cosine Transform or Discrete Fourier Transform, encoding a set of illumination, rotational, scale and other geometric transformations of the transformed patches into a CSFT or DCTF descriptor, and matches a second image to the first image using the set of prominent CSFT or DCTF descriptors.

The method of the present invention involves the same steps as the system and can be implemented using computer-executable instructions. In particular, the method involves identifying a plurality of key points and associated patches from a first image, detecting one or more key points and associated patches from the plurality of patches, generating a set of transformed patches by transforming the key points and associated patches from the spatial domain to the frequency domain using a Discrete Cosine Transform or Discrete Fourier Transform, encoding a set of illumination, rotational, scale transformations and other geometric transformations of the transformed patches into a CSFT or DCTF descriptor, and matching a second image to the first image using the set of prominent CSFT or DCTF descriptors.

Having provided some example scenarios, a technology suitable for performing these examples is described in more detail with reference to the drawings. It will be understood that additional systems and methods for matching images can be derived from the following description of the technology.

Turning now to FIG. 1, FIG. 1 illustrates a block diagram of example operating environment 100 in which implementations of the present disclosure may be employed. In particular, FIG. 1 illustrates a high-level architecture of operating environment 100 having components in accordance with implementations of the present disclosure. The components and architecture of FIG. 1 are intended as examples, as noted toward the end of the Detailed Description.

Among other components or engines not shown, operating environment 100 includes client device 102. Client device 102 is shown communicating using network 104 to server 106 and datastore 108. Server 106 is illustrated as hosting aspects of image matching system 110.

Client device 102 may be any type of computing device. One such example is computing device 800 described with reference to FIG. 8. Broadly, however, client device 102 can include computer-readable media storing computer-executable instructions executed by at least one computer processor.

Client device 102 may be operated by any person or entity that interacts with server 106 to employ aspects of image matching system 110. Some example devices suitable for use as client device 102 include a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, any combination of these delineated devices, or any other suitable device.

Client device 102 can employ computer-executable instructions of an application, which can be hosted in part or in whole at client device 102, or remote from client device 102. That is, the instructions can be embodied on one or more applications. An application is generally capable of facilitating the exchange of information between components of operating environment 100. The application may be embodied as a web application that runs in a web browser. This may be hosted at least partially on a server-side of operating environment 100. The application can comprise a dedicated application, such as an application having analytics functionality. In some cases, the application is integrated into the operating system (e.g., as a service or program). It is contemplated that "application" be interpreted broadly.

As illustrated, components or engines of operating environment 100, including client device 102, may communicate using network 104. Network 104 can include one or more networks (e.g., public network or virtual private network "VPN") as shown with network 104. Network 104 may include, without limitation, one or more local area networks (LANs) wide area networks (WANs), or any other communication network or method.

Server 106 generally supports image matching system 110. Server 106 includes one or more processors, and one or more computer-readable media. One example suitable for use is provided by aspects of computing device 800 of FIG. 8. The computer-readable media includes computer-executable instructions executable by the one or more processors. The instructions may optionally implement one or more components of image matching engine 110, which will be described in additional detail below with reference to FIG. 2. As with other components of FIG. 1, while server 106 is illustrated a single server, it can include one or more servers, and various components of server 106 can be locally integrated within the one or more servers or may be distributed in nature.

Operating environment 100 is shown having datastore 108. Datastore 108 generally stores information including data, computer instructions (e.g., software program instructions, routines, or services), or models used in embodiments of the described technologies. Although depicted as a single component, datastore 108 may be embodied as one or more datastores or may be in the cloud. One example of datastore 108 includes memory 812 of FIG. 8.

Having identified various components of operating environment 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are intended as examples in nature and in number and are not to be construed as limiting for all implementations of the present disclosure. Other arrangements and elements (e.g., machines, interfaces, functions, orders, and groupings of functions, etc.) can be used in addition to or instead of those shown, and some elements may be omitted altogether.

Figure 2:
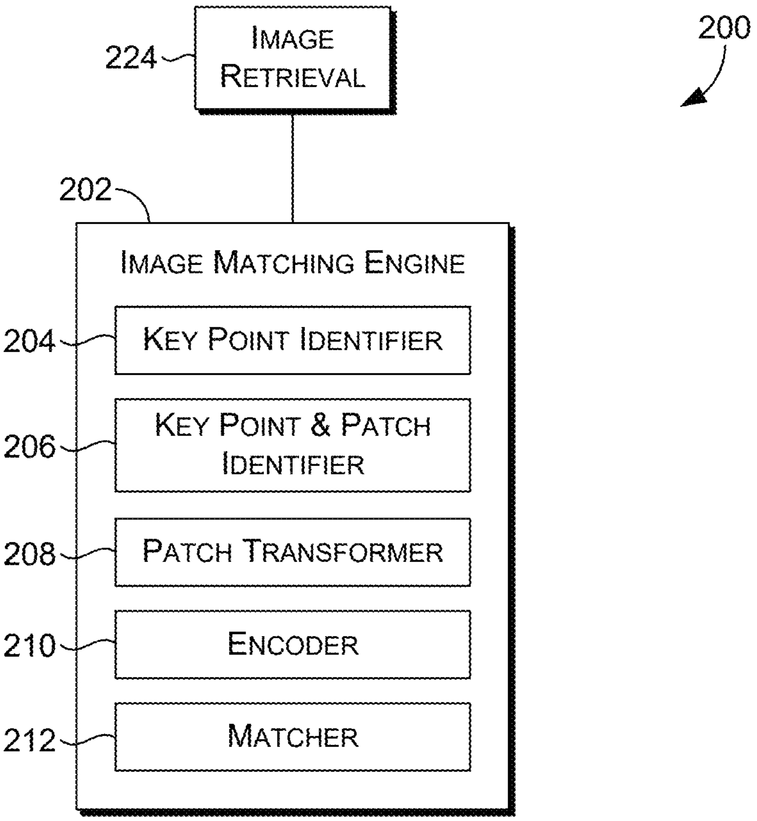
FIG. 2 is a block diagram of an example image matching system, in accordance with an aspect described herein.

With regard to FIG. 2, an example image matching system 200 is provided. Image matching system 200 is suitable for use as image matching engine 110 of FIG. 1. Many of the elements described in relation to FIG. 2 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

As illustrated in FIG. 2, image matching system 200 includes image matching engine 202. Image matching engine 202 generally identifies patches within an image and matches those patches through various algorithms to a matching image. To do so, image matching engine 202 employs item patch identifier 204, key patch identifier 206, patch transformer 208, encoder 210, and matcher 212.

As illustrated, image matching engine 202 generally matches a first image to a second image. To do so, the image matching engine 202 communicates with image retrieval 224 to retrieve the first image or reference image and a second image or matching image. Patch identifier 204 is generally configured to perform tasks related to detecting and extracting smaller regions or segments of an image that contain specific features of interest. Patch identifier 204 may perform task such as identifying patches within an image is through the use of convolutional neural networks (CNNs). CNNs are deep learning models that are specifically designed to process images and are highly effective at identifying features and patterns within them. They typically involve multiple layers of convolutional and pooling operations, which allow them to capture both spatial and hierarchical information about the image.

Figure 4:
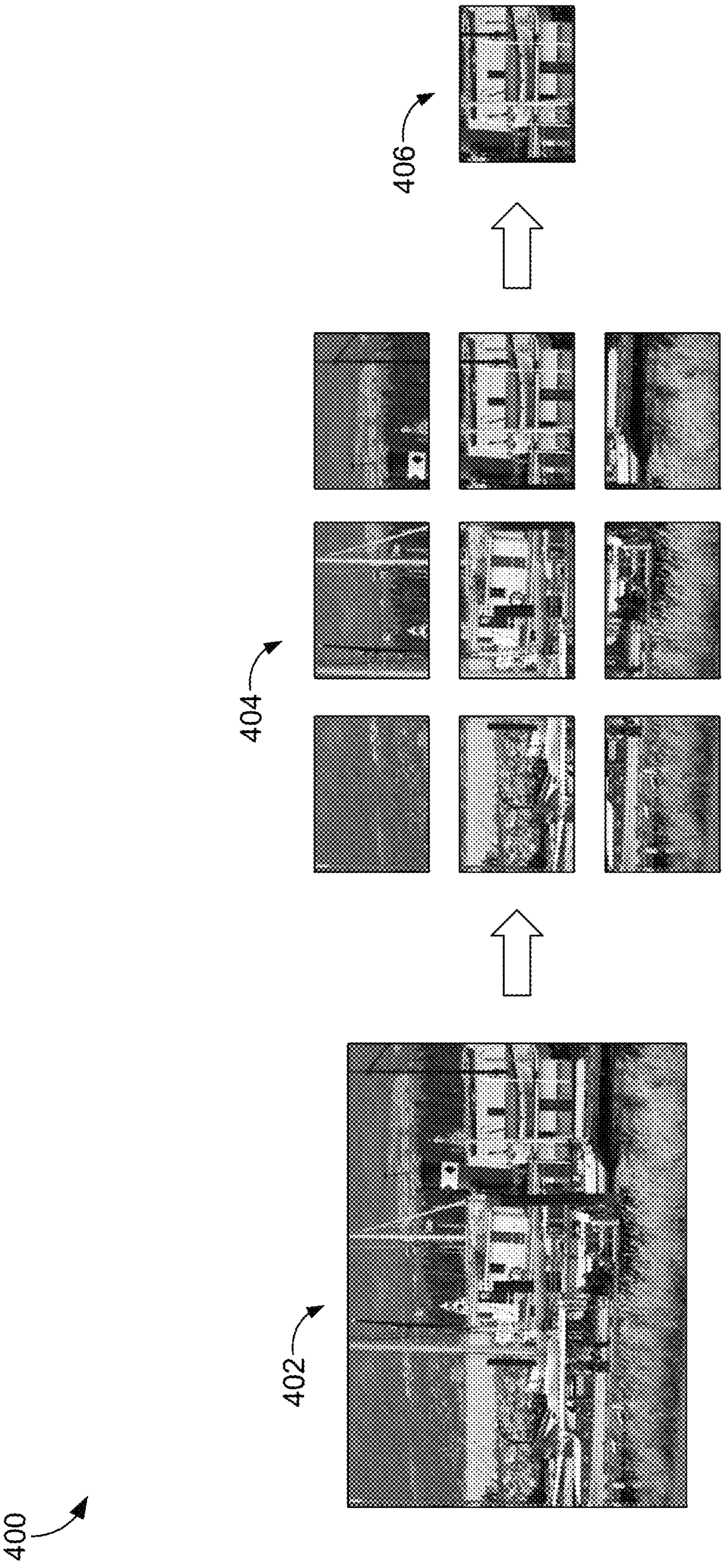
FIG. 4 is an illustration of flow diagrams illustrating functions performed by the image matching system of FIG. 2, in accordance with an aspect described herein.

Key point identifier 204 as illustrated and described further in FIG. 4. The key point and associated patch identifier 204 generally identifies image patches within the first image or reference image. To do this the key point identifier may use methods related to identifying key points within an image through the use of feature detectors both traditional hand-crafted, such as the Scale-Invariant Feature Transform (SIFT) or Speeded Up Robust Feature (SURF), or any deep learning based feature point detector. These methods involve extracting key points from an image and may include an associated feature descriptor that is invariant to scale, rotation, and illumination changes like SIFT or SURF. Once these key feature points are identified, patches can be extracted from the image around each important key point location.

The key point identifier 204 uses a feature detector approach to identifying patches within an image that involves detecting and extracting key points and descriptors from an image. The key points represent salient regions of an image that are invariant to scale, rotation, other geometric and illumination changes. The descriptors are vectors that encode the local appearance and texture information around each key point. Once the key points are identified, patches can be extracted from the image around each key point location and the associated key point CSFT or DCTF descriptor computed.

The key point identifier 204 uses a variety of methods for detecting key points. Scale-Invariant Feature Transform (SIFT) involves detecting key points using difference of Gaussian filters at multiple scales and orientations. The key points are then refined using a technique called scale-space extrema detection, which helps to ensure that they are invariant to scale changes. The descriptors are computed by sampling the gradient magnitude and orientation around each key point location. The Speeded Up Robust Feature (SURF) is based on the SIFT method but is computationally more efficient. It involves detecting key points using a technique called the Hessian matrix, which captures both scale and location information. The Hessian matrix is used to identify one or more key points within the image and plurality of patches that are sorted from best to worst and a desired number of key points is kept per image. The descriptor distances can be computed using a technique called the Sum of Absolute Differences (SAD), which is faster than the Euclidean distance involving square roots.

The key point identifier 204 may also detect the patches in nonlinear scale space because the traditional linear scale space adopted by features such as SIFT and SURF is constructed by applying linear filtering that tends to remove both noise and semantically important structures in the image. The patch identifier 204 utilizes the Fast Explicit Diffusion (FED) approach to efficiently create the nonlinear scale space where noise is smoothed locally and distinct crisp object edges are maintained, suitable for feature detection. The nonlinear scale space consists of 4 octaves and each octave contains 4 scales.

The key point identifier 204 uses a FED algorithm that works by iteratively solving the diffusion partial differential equation (PDE) using an explicit scheme. At each iteration, the algorithm updates the intensity values of each pixel based on the intensity values of its neighboring pixels. The update rule is based on a diffusion coefficient that controls the rate of diffusion and is adaptive to the local image structure. In areas of high image contrast or sharp edges, the diffusion coefficient is reduced to preserve image details, while in areas of low contrast or smooth regions, the diffusion coefficient is increased to promote smoothing.

Figure 5:
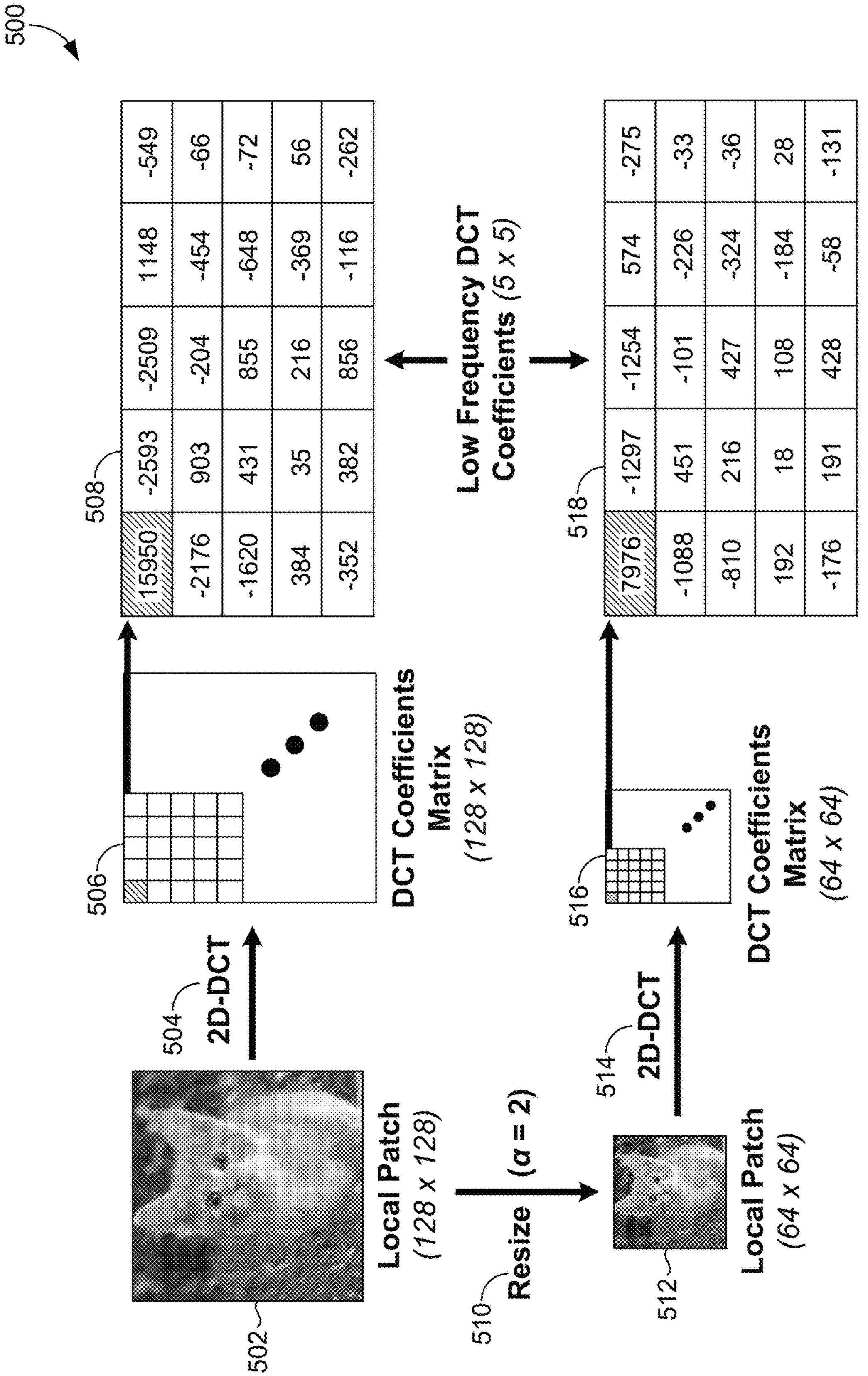
FIG. 5 is an illustration of flow diagrams illustrating functions performed by the image matching system of FIG. 2, in accordance with an aspect described herein.

Key patch identifier 206, as illustrated and described in FIG. 5, The key patch identifier 204 generally identifies a key patch from among the identified patches. To do this the patch identifier operates by selecting a patch that represents the underlying image region or key point of interest. The key point and associated patch identifier 206 may use feature matching and clustering techniques. These methods involve comparing the descriptors of each patch to a set of reference descriptors and clustering similar patches together. The cluster centroid is then used as the key patch for that particular region or object.

Key patch identifier 206 may also use saliency maps. Saliency maps are generated by computing a measure of the visual saliency of each patch in the image. The saliency measure is typically based on low-level image features such as color, texture, and orientation. The patch with the highest saliency score is then selected as the key patch for that particular region or object.

The selection of a key patch by the key patch identifier 206 is used in the image processing and computer vision tasks, such as object recognition, image retrieval, and video summarization. The key patch identifier 206 may also compute a detection response map using a Hessian matrix for each filtered image in the nonlinear scale space. The Hessian matrix for image I at scale space σ in octave o is defined as follows in equation 1.

$$\mathcal{H}(\sigma, o) = \begin{bmatrix} I_{xx}(\sigma, o) & I_{xy}(\sigma, o) \\ I_{xy}(\sigma, o) & I_{yy}(\sigma, o) \end{bmatrix} \quad (1)$$

where $I_{xx}(\sigma, o)$ is the second order derivative $$\frac{\partial^2}{\partial x^2}$$

of image I at scale space σ in octave o, and similarly for $I_{xy}(\sigma, o)$ and $I_{yy}(\sigma, o)$. The trace and determinant of the Hessian matrix are given below.

$$\text{Trace}\,(\mathcal{H}(\sigma, o)) = I_{xx}(\sigma, o) + I_{yy}(\sigma, o) \quad (2)$$

$$\text{Det}(\mathcal{H}(\sigma, o)) = I_{xx}(\sigma, o) I_{yy}(\sigma, o) - I_{xy}^2(\sigma, o) \quad (3)$$

The detection response map $\mathcal{R}(\sigma, o)$ can be computed as follows with respect to equation 4.

$$\mathcal{R}(\sigma, o) = \sigma_{norm}^2 \times \frac{\text{Trace}(\mathcal{H}(\sigma, o))^2}{|Det(\mathcal{H}(\sigma, o))| + 1} \quad (4)$$

where $\mathcal{R}(\sigma, o)$ is normalized by a scale factor $\sigma_{norm}=\sigma/2^{o}$.

The key patch identifier 206 locates the local maxima in a detection response map by comparing the response of a pixel with its neighboring pixels within a local window in the same scale. A local window of size 7×7 is used to prevent clusters of detected key patches (non-maximum suppression) and ensure the effectiveness of the proposed CSFT detector for large-scale imagery. After that, the key patch identifier 206 checks each local maximum pixel with respect to pixels within 7×7 windows at the same spatial location across scales in 4 octaves, and only keep the pixels whose responses are the maximum across scales as key patches to exclude duplicate key patches that exist at the same location or inside a small local region. Finally, sub-pixel accuracy for key point and associated patch localization is achieved by fitting a 2D quadratic function to the local window in the detection response map to estimate the interpolated location.

Patch transformer 208 as shown and further describe in FIG. 5 generally transforms patches from the spatial domain to the frequency domain. To do this the patch transformer 208 operates by converting an image patch from a representation based on the spatial coordinates of its pixels to a representation based on the frequency components of the image. The patch transformer operates using a Discrete Cosine Transform (DCT) or a Discrete Fourier Transform. Other transforms are possible like wavelets, spherical harmonics and Haar Transform. The DCT maps the image data from the spatial domain to the frequency domain. DCT can approximate the image with a set of coefficients based on visual significance of the spatial frequency information, because for a typical image, much of the energy is concentrated at low frequencies that lie in the upper left corner of DCT matrix. For this reason, DCT is extensively used in image and video compression.

Given an M-by-N matrix f, the two-dimensional DCT is defined as follows in equation 5.

$$F(u, v) = \alpha_u \alpha_v \sum_{i=0}^{M-1} \sum_{j=0}^{N-1} f(i, j) \times \cos\frac{(2i+1)u\pi}{2M} \times \cos\frac{(2j+1)v\pi}{2N} \quad (5)$$

where 0≤u≤(M−1), 0≤v≤(N−1). f(i,j) is the intensity of pixel (i,j) in matrix f, and α_u and α_v are the normalization coefficients. The value F(u, v) is the DCT coefficient in row u and column v of the DCT matrix.

DCT is an invertible operator. The inverse DCT is defined as follows in equation 6.

$$f(i, j) = \sum_{u=0}^{M-1} \sum_{v=0}^{N-1} \alpha_u \alpha_v F(u, v) \times \cos\frac{(2i+1)u\pi}{2M} \times \cos\frac{(2j+1)v\pi}{2N} \quad (6)$$

where 0≤i≤(M−1), 0≤j≤(N−1). For both DCT and inverse DCT, $\alpha_u$ and $\alpha_v$ are given below in equations 7 and 8.

$$\alpha_u = \begin{cases} 1/\sqrt{M}, & u = 0 \\ \sqrt{2/M}, & 1 \le u \le M-1 \end{cases} \quad (7)$$

$$\alpha_v = \begin{cases} 1/\sqrt{N}, & v = 0 \\ \sqrt{2/N}, & 1 \le v \le N-1 \end{cases} \quad (8)$$

The inverse DCT (IDCT) can be regarded as the process of reconstructing the M-by-N matrix f by multiplying the basis functions of DCT and the DCT coefficients F(u, v) and computing the sum. The DCT coefficient corresponding to the first basis function at the upper left corner is the DC coefficient (term). The remaining are the spatial frequency coefficients (AC terms) in increasing order.

Encoder 210 operates using a set of algorithms in DCT domain for geometric transformations where pixels can be shifted regularly by exchanging column/row or reversing sign on the DCT coefficients. For notational simplicity and practical purposes, a square input image is used as an example. Given an M-by-M image f(i, j), rotating it by 90° in spatial domain generates an output image g(i, j). The transformation can be expressed as:

$$g(i, j) = f(M-1-j,\ i),\ i, j = 0, 1, \ldots, (M-1). \quad (9)$$

According to equation 5, the DCT coefficients of g(i, j) can be computed as follows.

$$G(u, v) = \alpha_u \alpha_v \sum_i \sum_j g(i, j) \times \cos\frac{(2i+1)u\pi}{2M} \times \cos\frac{(2j+1)v\pi}{2M}. \quad (10)$$

Let i'=M−1−j, j'=i. Using Eq 9, G(u, v) can be computed as follows.

$$G(u, v) = \alpha_u \alpha_v \sum_{j'} \sum_{i'} f(i', j') \times \cos\frac{(2j'+1)u\pi}{2M} \times \cos\frac{(2(M-1-i')+1)v\pi}{2M} = \cos(v\pi)\alpha_u \alpha_v \sum_{j'} \sum_{i'} f(i', j') \times \cos\frac{(2j'+1)u\pi}{2M} \cos\frac{(2i'+1)v\pi}{2M} = \cos(v\pi)F(v, u) \quad (11)$$

Note that in Eq 11, cos(vπ) can only be +1 or −1 since v is an integer. Computing G(u, v) can be simplified as:

$$G(u, v) = \begin{cases} F(v, u), & \text{if } v \text{ is even} \\ -F(v, u), & \text{if } v \text{ is odd} \end{cases}. \quad (12)$$

Equation 12 shows that rotating image f(i, j) by 90° can be computed in the compressed domain by exchanging rows and columns of the DCT matrix F(u, v), followed by sign-reversing coefficients in every other column of F(u, v). Geometric transformations for rotating the image f(i, j) by 180° and 270° in the DCT domain can be derived in a similar manner (see Table 1). Rotations from 0° to 90° are applied to the local patch around the key patch and compute their corresponding DCT matrix, from the DCT matrices for 90° to 360° rotation is obtained, without actually performing rotations on the original patch. This significantly reduced descriptor size and computational overhead.

Matcher 212 operates by incorporating multi-size and multi-orientation encoding. The matcher 212 operates for image matching offers a significant improvement over existing methods for matching images. By incorporating multi-size and multi-orientation encoding, the matcher 212 is able to create a CSFT descriptor for each keypoint in the first image. This descriptor contains information from the local neighborhood of the keypoint, with rotations only from 0° to 90°.

As referenced herein, a references image may also be referred to a first image and a matching image may also be referred to as a second image. When matching a matching image such as matching image 310 in FIG. 3, to a reference image such as reference image 302 of FIG. 3, the matcher 212 expands the candidate descriptors $v_c$ in the matching image to incorporate DCT coefficients from the patch rotations within range (90°, 360°). This allows for information from the other three quadrants to be included in the feature matching process. The expanded candidate descriptor $v_c'$ is then reshaped into a 3-D vector of size 24×5×12, denoted as M(i, j, θ), where i is the DCT coefficient index for rotation θ and crop j.

Further, the descriptor for the keypoint in the reference image is cropped to a subvector S, which includes the DCT coefficients from 3 crops for 0° rotation. The reshaped subvector S(i,j) serves as the reference template for matching. The Matcher 212 then computes a vectorized Normalized Cross Correlation (VNCC) matrix V by performing NCC between S(i,j) and M(i, j, θ). VNCC matrix V contains correlation scores of each crop and rotation combination in the matching candidate descriptor $v_c$ with respect to the reference descriptor $v_r$.

The matcher 212 then determines the best match between the reference image and the matching image by applying a distance ratio matching strategy described below. By incorporating multi-size and multi-orientation encoding, and expanding candidate descriptors to include information from all four quadrants, matcher 212 is able to generate more robust feature descriptors for matching images, resulting in improved image matching accuracy.

Figure 6:
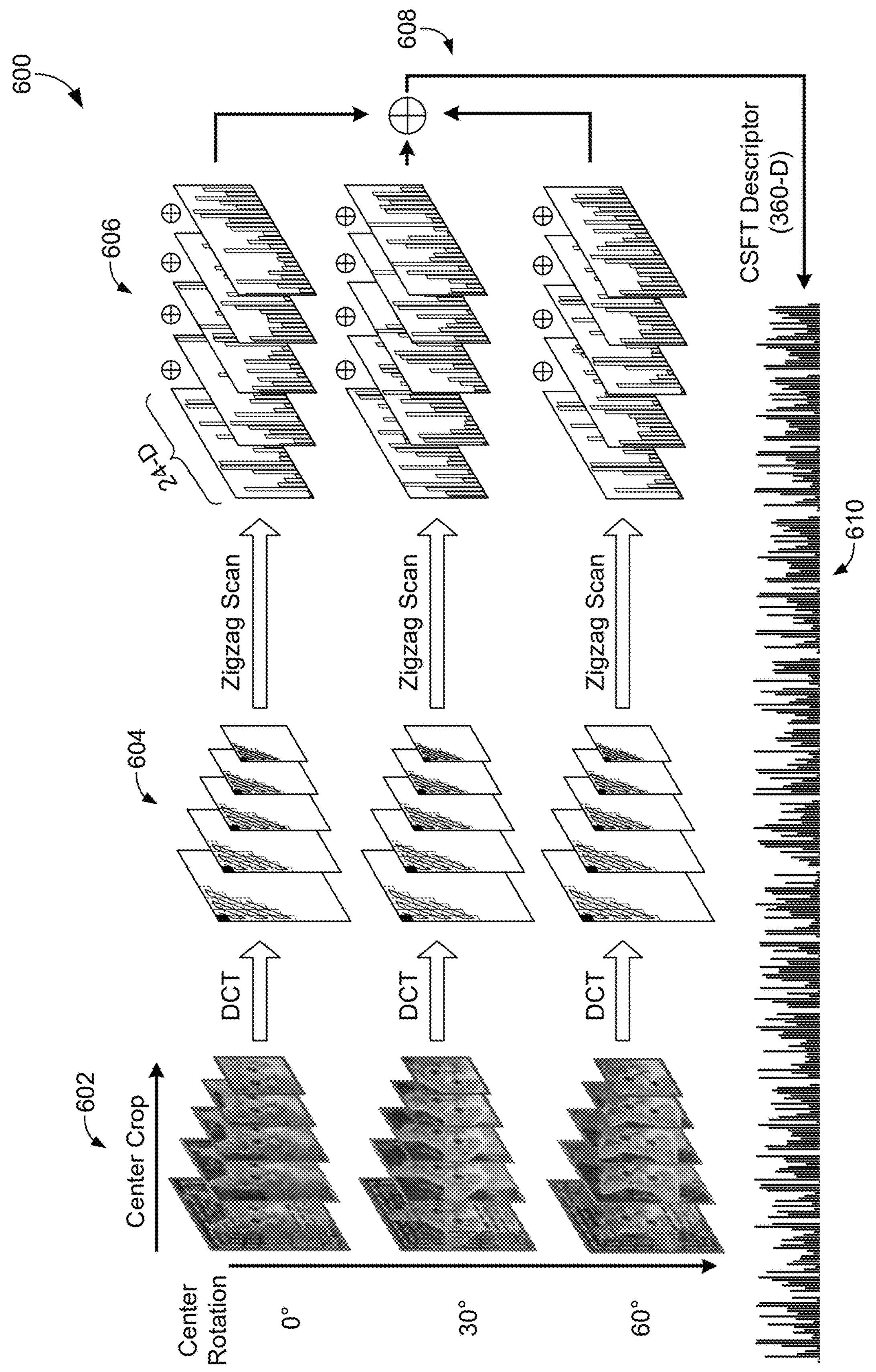
FIG. 6 is an illustration of flow diagrams illustrating functions performed by the image matching system of FIG. 2, in accordance with an aspect described herein

A CSFT descriptor for a keypoint contains information from its local neighborhood of different sizes rotating only from 0° to 90°. For a candidate descriptor $v_c$ in the matching image, however, information from the other three quadrants is also needed for feature matching. So candidate descriptors are expanded in the matching image to incorporate the DCT coefficients from the patch rotations within range (90°, 360°) using the DCT property. Compared to its original size (c*r*n=5×3×24=360), the size of the expanded candidate descriptor $v_c'$ is increased by 3 times (360+3×360=1440). After that, the expanded candidate descriptor $v_c'$; is reshaped into a 3-D vector of size 24×5×12 which in FIG. 5 is denoted as M(i, j, θ), where i is the DCT coefficient index for rotation θ and crop j. From the descriptor $v_r$, in the reference image, it is cropped to a subvector S, which includes the DCT coefficients from 3 crops (crop #2, crop #3, crop #4) for 0° rotation. Similar to the candidate descriptor, subvector S is then reshaped into a 2-D vector of size 24×3. The reshaped subvector S(i,j) acts as a reference template for matching. Afterwards, a vectorized Normalized Cross Correlation (VNCC) matrix V is computed by performing NCC between S(i,j) and M(i, j, θ) as shown in FIG. 6. VNCC matrix V is a 2-D vector of size c×r=5×12, containing correlation scores of each crop and rotation combination in the matching candidate descriptor $v_c$ with respect to the reference descriptor $v_r$. VNCC is a specialized tensor product operation defined as follows in equation 13, $$
\begin{aligned}
V_{[5\times12]}(i,\ j,\ \theta) &= \mathcal{S}_{[1\times72]} * v'_{c[1\times1440]} = \\
\mathbb{R}^{24\times3}(\mathcal{S}_{[1\times72]}) * \mathbb{R}^{24\times5\times12}\left(v'_{c[1\times1440]}\right) &= \mathcal{S}_{[24\times3]}(i,\ j) * M_{[24\times5\times12]}(i,\ j,\ \theta) = \\
&\sum_{j=2}^{4}\sum_{i=1}^{24}[\mathcal{S}(i,\ j)\cdot M(i,\ \mathrm{mod}((c+j-3),\ 5)+1,\ \theta)]
\end{aligned}
\tag{13}
$$

In equation 13 $R^{(n\times c)}$ $(v_{(1\times m)})$ is a reshape operator that takes as input an 1×m vector v, and reshapes it to an n×c matrix. Each matching candidate $v_c$ produces a VNCC matrix V. The maximum of V is considered as the final matching score between the reference descriptor and the current candidate matching descriptor. It is determined the best match by applying the distance ratio matching strategy with the ratio t set to 0.7.

Figure 3:
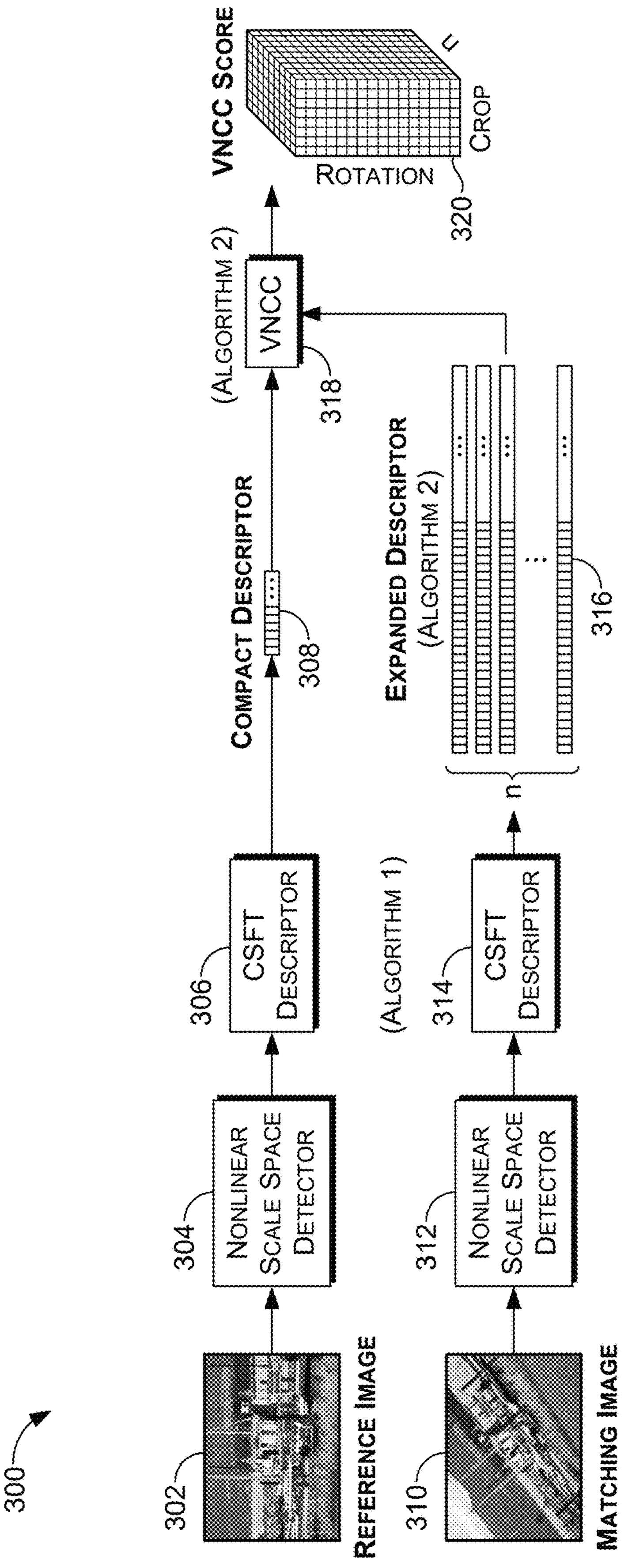
FIG. 3 is an illustration of flow diagrams illustrating functions performed by the image matching system of FIG. 2, in accordance with an aspect described herein.

Turning now to FIG. 3, an illustration is provided of an example image matching using image matching engine 300 of FIG. 2. Reference is now made to both FIG. 2 and FIG. 3. With regard to FIG. 3, an example image matching system 300 is provided. Image matching system 300 is suitable for use as image matching system 110 of FIG. 1. Many of the elements described in relation to FIG. 3 are functional entities that may be implemented as discrete or distributed components or in conjunction with other components, and in any suitable combination and location. Various functions described herein are being performed by one or more entities and may be carried out by hardware, firmware, or software. For instance, various functions may be carried out by a processor executing computer-executable instructions stored in memory.

As illustrated in FIG. 3, process flow diagram of steps performed by the image matching system 300 in order to match a first image to a second image. The image flow diagram includes reference image 302, nonlinear scale space detector 304 and 312, CSFT descriptor 306 and 314, compact descriptor 308, matching image 310, expanded descriptor 316 VNCC 318, and VNCC score 320.

The image mapping system 300 generally matches images. That is, a first image, also referred to as a reference image is matched to a second image, also referred to as a matching image, by the image mapping system 300. To do so, image matching engine 202 employs reference image 302, nonlinear scale space detector 304 and 312, CSFT descriptor 306 and 314, compact descriptor 308, matching image 310, expanded descriptor 316 VNCC 318, and VNCC score 320.

With respect to the reference image 302 and the matching image 310, multi-scale features or patches are detected in nonlinear scale space by the nonlinear scale space detectors 304, 312. Traditional linear scale space adopted by features such as SIFT and SURF is constructed by applying linear filtering that tends to remove both noise and semantically important structures in the image. Nonlinear scale space detector 304, 312 utilizes the Fast Explicit Diffusion (FED) to efficiently create the nonlinear scale space where noise is smoothed locally and object edges are maintained, suitable for feature detection. The nonlinear scale space consists of 4 octaves and each octave contains 4 scales.

The CSFT descriptors 306, 314 utilize the mathematical DCT properties discussed above to encode multi-scale and multi-orientation representations in the descriptor. Creating a CSFT descriptor 306 and 312 requires a group of image patches that are center-cropped from a local region around a keypoint. Each patch is rotated from 0° to 60° with increment of Δθ=30°, (0°, 30°, 60°). Both Δθ and c can be adjusted for higher matching accuracy. The DCT coefficient matrix for each patch is computed where the DC coefficient is shown in grey color and the rest are AC coefficients. Zig-zag scan is applied to re-organize the coefficients. The first n coefficients (n=24) in the DCT matrix for each patch are selected and concatenated to make a vector (360-D), which is the CSFT descriptor for the keypoint.

For a keypoint a group of rotations is applied to the local region around. For each local patch is rotated by angle i*Δθ which produces a rotated patch. The range of i*Δθ is [0°, 90°. Then patches of different sizes are center-cropped. Let M_0×M_0 denote the size of the smallest crop patch or local window (M_0=16). For each j∈{0, 1, 2, . . . , c−1}, a patch of dimension α^j M_0×α^j M_0 is cropped where α is the scale factor between patch sizes and is typically 1.5. After that, the DCT coefficient matrix C_(i,j)=DCT(p_k^((i,j))) is computed for each patch P_k^((i,j)). Because the most visually significant characteristics in an image lies at the upper left corner of the associated DCT coefficient matrix, the zig-zag scanning pattern is used to reorder the DCT coefficients and keep the DC coefficient and the first n AC coefficients in C_(i,j). The remaining AC coefficients are discarded. The AC coefficients is divided by the DC coefficient to normalize for illumination variances. DCT followed by zig-zag scan transforms an image patch to a 1-D vector that can be used for feature description. The process is repeated for each patch $P_{\_k}^{(i,j)}$ and concatenate the selected and normalized DCT coefficients as a vector that is the CSFT descriptor. The concatenation operator that forms a CSFT descriptor vector v is defined in equation 14:

$$v_k = \bigcup_{i=1}^{r-1}\bigcup_{j=0}^{c-1}\mathbb{Z}_n[C_{i,j}] = \bigcup_{i=1}^{r-1}\bigcup_{j=0}^{c-1}\mathbb{Z}_n\left[DCT\left(P_k^{(i,j)}\right)\right] \tag{14}$$

Equation 14 $Z_n$ [C_(i,j)] denotes the zig-zag operator that extracts the first n coefficients from DCT matrix $C_{(i,j)}$ in the zig-zag scanning pattern and then normalizes the selected coefficients. Note that both parameters c and r can be adjusted to obtain higher matching accuracy. Number of selected DCT coefficients n from each C_(i,j) is set to 24. The CSFT descriptor $v_k$ is a 1-D vector of size c*r*n=360.

Although the CSFT descriptor encodes rotations j*Δθ within a range only from 0° to 90°, the geometric transformation properties of DCT enables incorporation of rotations from the other three quadrants into the descriptor by simply exchanging column/row of the DCT coefficient matrix and reversing signs, instead of explicitly performing image rotation in the spatial domain. By taking advantage of the mathematical properties of DCT and multi-size center cropping scheme, multi-scale and multi-orientation representations for a keypoint can be encoded in the CSFT descriptor. Leveraging the natural properties of DCT leads to a compressed representation for the CSFT feature descriptor without compromising matching robustness and accuracy. Simply using location of a keypoint, a CSFT descriptor that is scale and rotation invariant can be extracted.

The compact descriptor 308 utilizes the CSFT descriptor 306, 314 which are highly efficient to perform the spatial geometric transformations in DCT domain by using the DCT geometric transformation property. This property is used to incorporate multiple orientation encodings in the CSFT feature descriptor to achieve geometric invariance and generating a compact descriptor 308. Only rotations from 0° to 90° are applied to the patch around the keypoint and compute their corresponding DCT matrix, from which the DCT matrices for 90° to 360° rotations is obtained computationally, without actually performing rotations on the original patch. This generates a compact descriptor 308.

Geometric invariance of the CSFT descriptor 306 is achieved by incorporating multi-size and multi-orientation encoding. As discussed above, the CSFT descriptor 306 for a keypoint and the reference image 302 contains information from its local neighborhood of different sizes rotating only from 0° to 90°. For a CSFT descriptor 314 of the matching image 310, however, information from the other three quadrants is also needed for feature matching. So CSFT descriptor 314 in the matching image incorporates the DCT coefficients from the patch rotations within range (90°, 360°) using the DCT property to generate an expanded descriptor 316. Compared to its original size (c*r*n=5×3×24=360), the size of the expanded descriptor 316 is increased by 3 times. After that, the expanded descriptor 316 is reshaped into a 3-D vector.

Afterwards, a vectorized Normalized Cross Correlation (VNCC) matrix 320 is computed by performing VNCC 318 between the compact descriptor 308 and the expanded descriptor 316. VNCC matrix 320 is a 2-D vector containing correlation scores of each crop and rotation combination in the matching CSFT descriptor 306 with respect to the CSFT descriptor 314. VNCC 318 is a specialized tensor product operation defined as follows in equation 15, $$\begin{aligned} V_{[5\times12]}(i,j,\theta) &= \mathcal{S}_{[1\times72]} * v'_{c[1\times1440]} = \\ \mathbb{R}^{24\times3}(\mathcal{S}_{[1\times72]}) * \mathbb{R}^{24\times5\times12}\left(v'_{c[1\times1440]}\right) &= \mathcal{S}_{[24\times3]}(i,j) * M_{[24\times5\times12]}(i,j,\theta) = \\ &\sum_{j=2}^{4}\sum_{i=1}^{24}[\mathcal{S}(i,j)\cdot M(i,\ \mathrm{mod}((c+j-3),\ 5)+1,\theta)] \end{aligned} \tag{15}$$

Equation 15 describes $R^{(n\times c)}v_{(1\times m)}$ as a reshape operator that takes as input an 1×m vector, and reshapes it to an n×c matrix. Each matching CSFT descriptor 306 produces a VNCC matrix 320. The maximum of VNCC matrix 320 is considered as the final matching score between the reference descriptor and the current candidate matching descriptor. The best match is determined by applying the distance ratio matching strategy with the ratio τ set to 0.7. It is the default matching strategy for the proposed CSFT feature due to its effectiveness for eliminating false positives.

As illustrated in FIG. 4, process flow diagram of steps performed by the image matching system 300 in order to identify patches and key patches within an image. The image flow diagram includes an image 402, a plurality of patches 404, and a key patch 406. The image 402 may be a first image or reference image such as reference image 302 in FIG. 3. The image 402 may also be a matching image or second image such as matching image 310 in FIG. 3.

The plurality of key points and associated patches 404 are identified within image 402 using systems and methods described in FIGS. 2 and 3. For example, key points and descriptors are detected and extracted from image 404. The key points represent salient regions of an image that are invariant to scale, rotation, other geometric and illumination changes. The descriptors are vectors that encode the local appearance and texture information around each key point. Once the key points and descriptors are extracted, the plurality of patches 404 can be extracted from the image 402 around each key point location.

The key patch 406 is identified from the plurality of patches 404 using systems and methods described in FIGS. 2 and 3. The key patch 406 is identified operates by selecting a patch from the plurality of patches 404 that best represents the underlying image region or object of interest. The key patch 406 may be identified using feature matching and clustering techniques. These methods involve comparing the descriptors of each patch to a set of reference descriptors and clustering similar patches together. The cluster centroid is then used as the key patch for that particular region or object.

Turning now to FIG. 5, a process flow diagram of steps performed by the image matching system 200 of FIG. 2. The image flow diagram includes local patch 502 DCT 504, DCT coefficients matrix 506 and 508, resize algorithm 510, resized local patch 512, and resized DCT coefficients matrix 516, 518. Image matching engine 202 generally identifies patches within an image and matches those patches through scale and photometric invariance through various algorithms to a matching image. To do so in part, image matching engine 202 employs local patch 502 DCT 504, DCT coefficients matrix 506 and 508, resize algorithm 510, resized local patch 512, and coefficients matrix 516, 518.

The coefficient matrices 506 and 508 represent the DCT transformed local patch 502. The patch transformer 208 of FIG. 2 operates to transform the local patch 502 from a spatial domain as represented in 502 to a frequency domain as shown in the coefficient matrices 506 and 508. This involves converting the image patch 502 from a representation based on the spatial coordinates of its pixels to a representation based on the frequency components of the image. The patch transformer 208 operates using a Discrete Cosine Transform (DCT) or a Discrete Fourier Transform. The DCT maps the image data from the spatial domain to the frequency domain. DCT can approximate the image with a set of coefficients, such as coefficient matrices 506 and 508, based on visual significance of the information, because for a typical image, much of the energy is concentrated at low frequencies that lie in the upper left corner of DCT matrix. For this reason, DCT is widely used in image and video compression.

An example demonstrating the built-in scale invariance of 2-D DCT 504 and 514. If the image patch 502 is down-sampled by a factor of 2 to generate resized local patch 512, the DCT coefficients of low frequency (e.g. 5×5) are sampled by ½ approximately. Scale invariance is achieved in the CSFT descriptor by adopting the similarity property of the Discrete Cosine Transform (DCT). If the image patch 502 is down-sampled by a factor of 2, the DCT coefficients of low frequency are sampled by ½ approximately. If the input signal of a large size is spatially sampled by factor of a, then in the transformed domain the DCT coefficients of low frequencies are sampled by the inverse amount approximately. Below is provide a derivation on 1-D signal for notational simplicity. First, 1-D DCT of signal f is given below in equation 16.

$$F(u) = \alpha_u \sum_{i=0}^{M-1} f(i)\cos\frac{(2i+1)u\pi}{2M} = \alpha_u \sum_{i=0}^{M-1} f(i)\cos\left[\frac{\pi}{M/2}\left(i+\frac{1}{2}\right)u\right]. \quad (16)$$

Let sample factor α=2, so i=2i' where i'∈{0, 1, 2, . . . , M/2−1}. Assume signal f is large in size, so there is no abrupt change in the intensity of adjacent pixels: f(2i')≈f (2i'+1). F(u) can be approximated as follows.

$$F(u) \approx 2\times\alpha_u \sum_{i'=0}^{\frac{M}{2}-1} f(2i')\cos\left[\frac{\pi}{M/2}\left(i'+\frac{1}{2}\right)u\right]\times\cos\left(\frac{2\pi}{M}\cdot\frac{1}{4}u\right). \quad (17)$$

Assume only a small number of coefficients at the upper left corner of DCT matrix are considered, so u<<2M. F(u) can be further simplified as:

$$F(u) \approx 2\times\alpha_u \sum_{i'=0}^{\frac{M}{2}-1} f(2i')\cos\left[\frac{\pi}{M/2}\left(i'+\frac{1}{2}\right)u\right] \approx 2\times F'(u) \quad (18)$$

In equation 18 F'(u) denotes the DCT coefficient for the down-sampled image.

The similarity property can be extended to 2-D DCT 504. A local patch 502 of size 128×128 is down-sampled by a factor of 2 to local patch 512. After computing the DCT coefficient matrix 506 and 516, the first 5×5 DCT coefficients at the upper left corner of the resized image are approximately sampled by ½ compared to those of the original image. This property applies to CSFT since the CSFT descriptor only uses a small set of the low-frequency coefficients in a DCT matrix. Dividing each AC coefficient by the DC coefficient, (F(u, v))/(F(0, 0)) normalizes for scale differences. The DC coefficient F(0, 0) of a DCT matrices 506, 508, 516, 518 is defined in equation 19, $$F(0,0) = \alpha_u\alpha_v \sum_{i=0}^{M-1}\sum_{j=0}^{N-1} f(i,j) \quad (19)$$

Equation 19 represents the normalized sum of intensity of all pixels in grayscale image f. So dividing AC terms by the DC term simultaneously normalizes for illumination shift. Other photometric transformations in the image such as noise, compression artifacts, and image blur are similar to applying a low-pass filter in the frequency domain and reducing the effect of high-frequency components. Low-pass filtering transformations can be naturally handled in the DCT frequency domain by retaining the low order AC coefficients and discarding higher frequency terms.

Turning now to FIG. 6, a process flow diagram of steps performed by the image matching system 200 of FIG. 2. The image flow diagram includes images 602, DCT coefficient matrices 604, re-organized matrices 606, concentrator 608, and CSFT descriptor 610.

Figure 7:
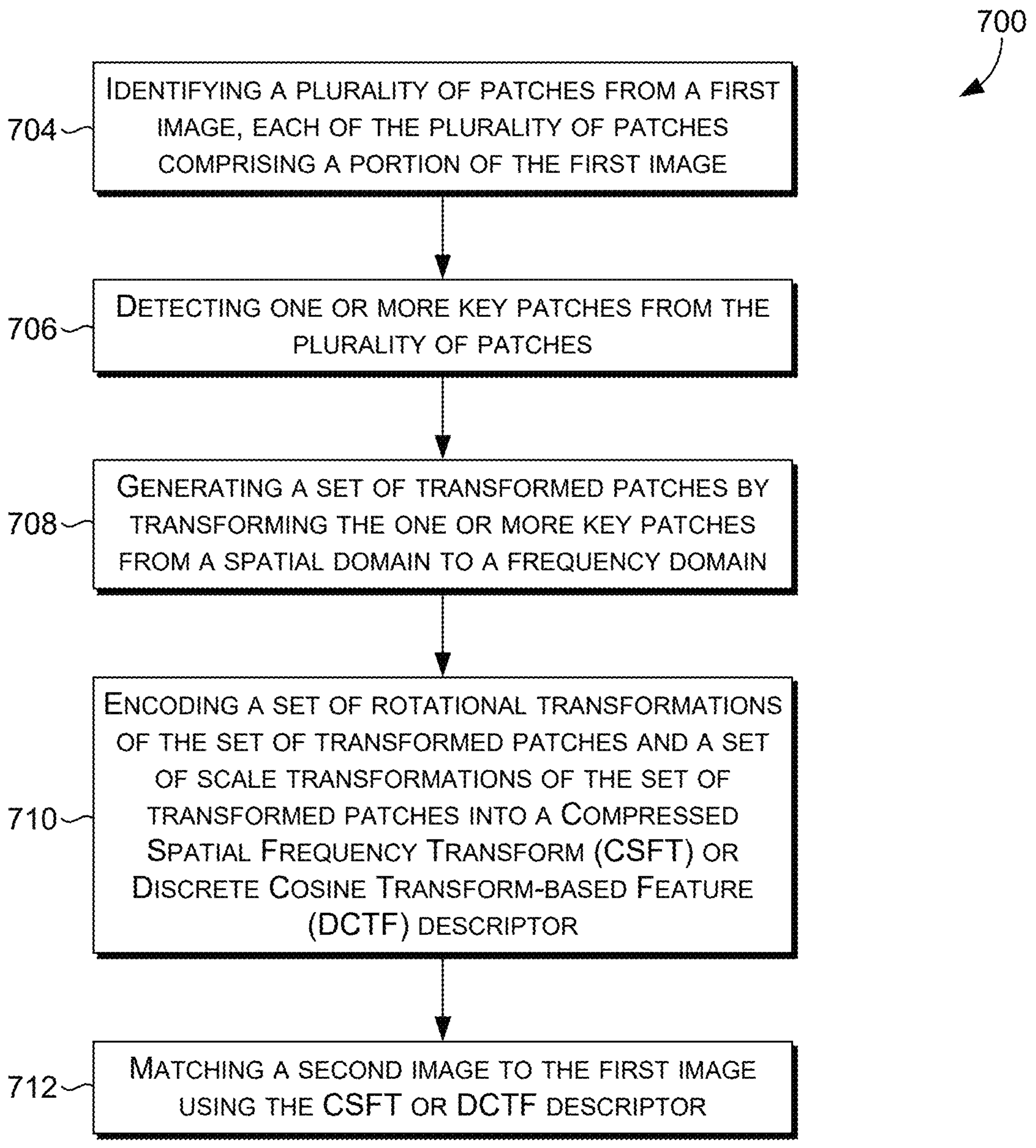
FIG. 7 is block diagrams illustrating an example method for image matching in accordance with an aspect described herein.

A group of images 602 are center-cropped from the local region around a keypoint. Each patch is rotated from 0° to 60° with increment of Δθ=30°, (0°, 30°, 60°). Both Δθ and c can be adjusted for higher matching accuracy. The DCT coefficient matrix 604 for each patch is computed where the DC coefficient is shown in grey color and the rest are AC coefficients. Zig-zag scan is applied to re-organize the coefficients and generate the re-organized matrices 606. The first n coefficients (n=24) in the DCT matrix for each image patch associated with a key point are selected and concatenated by the multiscale merge operator 608. The resultant concentrated matrices make a vector (360-D), which is the CSFT descriptor 610 for the keypoint Regarding FIG. 7, a block diagram is provided to illustrate a method for matching images. The methods may be performed using the image matching engine 202. In embodiments, one or more computer storage media having computer-executable instructions embodied thereon that, when executed, by one or more processors, cause the one or more processors to perform the methods. The method may be part of computer-implemented methods implemented by systems that include computer storage media and at least one processor. It will be recognized that the methods described within FIG. 6 is an example method and that other methods can and will be derived from the described technology.

The method 700 begins by identifying a plurality of patches from a first image at block 704. The patches can be identified using a sliding window approach or segmentation. One or more key patches are then detected from the plurality of patches using a feature detection algorithm at block 706. The key patches are important regions of the image that can be used to represent the entire image and are detected in a non-linear scalar space A set of transformed patches is generated at block 708, transforming the key patches from the spatial domain to the frequency domain. The transformed patches are then encoded into a DCTF descriptor by applying a discrete cosine transform and concatenating the resulting coefficients at block 710. The DCTF descriptor is a compact and discriminative representation of the image that is robust to various image transformations and can encode both scale and rotation information.

Patches are extracted from a second image in a similar manner. DCTF descriptors are generated for each patch from the second image. The DCTF descriptors of the patches from the first image are then compared to those of the patches from the second image using a distance ratio at block 712. The patches with the smallest distance are considered matches. A final transformation model can be estimated using the matched patches.

Figure 8:
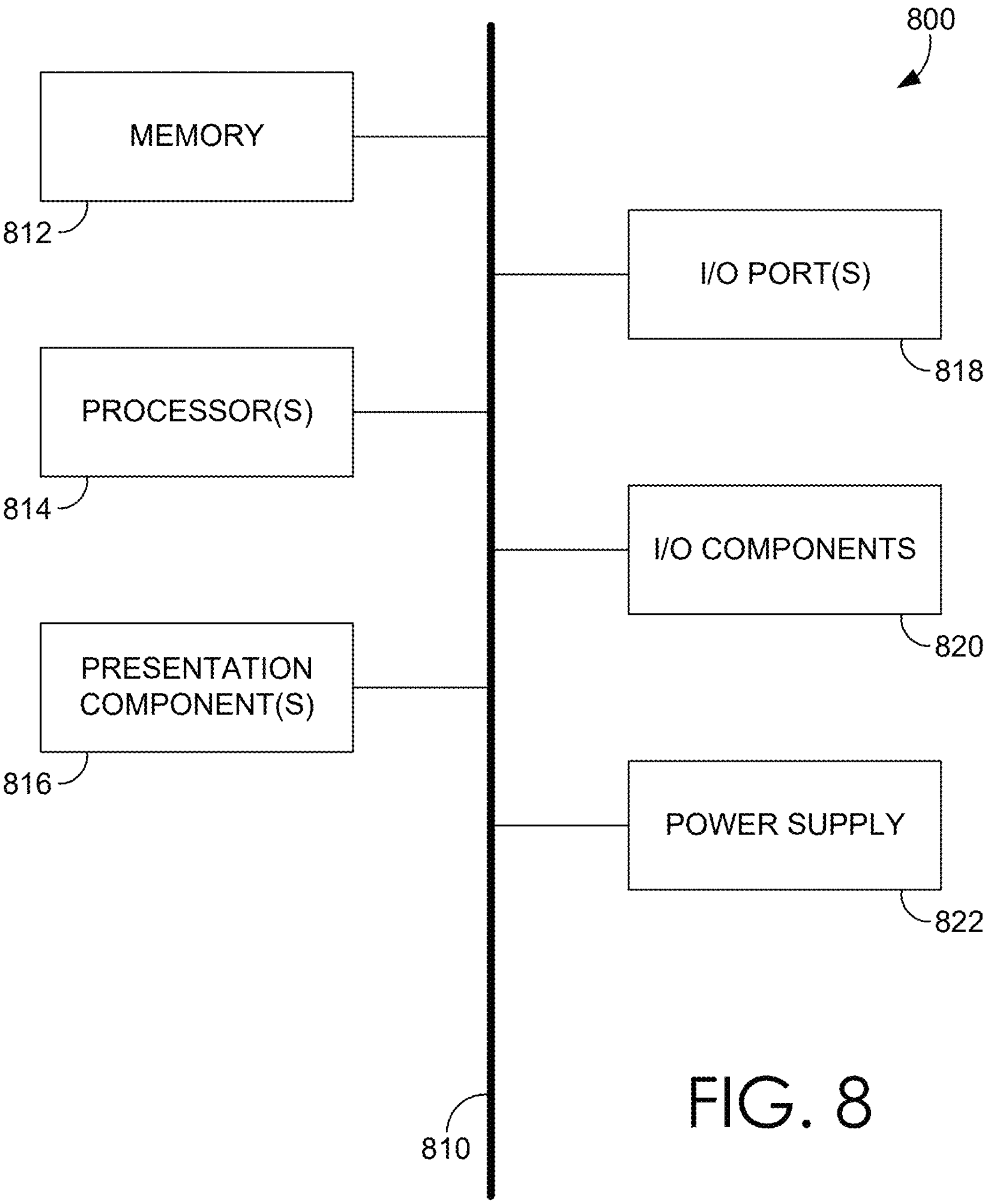
FIG. 8 is an example computing device suitable for implementing aspects of the described technology, in accordance with an aspect described herein.

Having described an overview of embodiments of the present technology, an example operating environment in which embodiments of the present technology may be implemented is described below in order to provide a general context for the various aspects. Referring initially to FIG. 8, in particular, an example operating environment for implementing embodiments of the present technology is shown and designated generally as computing device 800. Computing device 800 is but one example of a suitable computing environment and is not intended to suggest any limitation as to the scope of use or functionality of the technology. Neither should computing device 800 be interpreted as having any dependency or requirement relating to any one or combination of components illustrated.

The technology of the present disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The technology may be practiced in a variety of system configurations, including hand-held devices, consumer electronics, general-purpose computers, more specialty computing devices, etc. The technology may also be practiced in distributed computing environments where tasks are performed by remote-processing devices that are linked through a communications network.

With continued reference to FIG. 8, computing device 800 includes bus 810 that directly or indirectly couples the following devices: memory 812, one or more processors 814, one or more presentation components 816, input/output ports 818, input/output components 820, and illustrative power supply 822. Bus 810 represents what may be one or more busses (such as an address bus, data bus, or combination thereof).

Although the various blocks of FIG. 8 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. This is the nature of the art, and it is reiterated that the diagram of FIG. 8 merely illustrates an example computing device that can be used in connection with one or more embodiments of the present technology. Distinction is not made between such categories as "workstation," "server," "laptop," "hand-held device," etc., as all are contemplated within the scope of FIG. 8 and reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media.

Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer storage media in the form of volatile or nonvolatile memory. The memory may be removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Examples of presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc.

Embodiments described above may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of the present technology is described with specificity herein to meet statutory requirements. However, the description itself is not intended to limit the scope of this disclosure. Rather, the inventors have contemplated that the claimed or disclosed subject matter might also be embodied in other ways, to include different steps or combinations of steps similar to the ones described in this document, in conjunction with other present or future technologies. Moreover, although the terms "step" or "block" might be used herein to connote different elements of methods employed, the terms should not be interpreted as implying any particular order among or between various steps herein disclosed unless and except when the order of individual steps is explicitly stated.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters" using communication media described herein. Also, the word "initiating" has the same broad meaning as the word "executing or "instructing" where the corresponding action can be performed to completion or interrupted based on an occurrence of another action. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however the distributed computing environment depicted herein is merely an example. Components can be configured for performing novel aspects of embodiments, where the term "configured for" or "configured to" can refer to "programmed to" perform particular tasks or implement particular abstract data types using code. Further, while embodiments of the present technology may generally refer to a image matching system and the schematics described herein, it is understood that the techniques described may be extended to other implementation contexts.

From the foregoing, it will be seen that this technology is one well adapted to attain all the ends and objects described above, including other advantages that are obvious or inherent to the structure. It will be understood that certain features and subcombinations are of utility and may be employed without reference to other features and subcombinations. This is contemplated by and is within the scope of the claims. Since many possible embodiments of the described technology may be made without departing from the scope, it is to be understood that all matter described herein or illustrated in the accompanying drawings is to be interpreted as illustrative and not in a limiting sense.

What is claimed is:

1. A system for image matching, the system comprising:

at least one processor; and one or more computer storage media storing computer executable instructions that when executed by the at least one processor, cause the at least one processor to perform operations comprising:

identifying a plurality of patches from a first image, each of the plurality of patches comprising a portion of the first image;

detecting a first key patch from the plurality of patches;

rotating the first key patch at a plurality of pre-determined angles to generate rotated versions of the first key patch;

scaling the rotated versions of the first key patch at a plurality of scales to generate a set of scaled versions of each rotated version of the first key patch, wherein the rotating and the scaling generates a plurality of geometrically transformed patches of the first key patch;

transforming the plurality of geometrically transformed patches of the first key patch from a spatial domain to a Fourier frequency domain or a Discrete Cosine Transform frequency domain to generate a set of rotationally-invariant, scale-invariant frequency domain features of the first key patch;

normalizing the set of rotationally-invariant, scale-invariant frequency domain features of the first key patch to generate a set of rotationally-invariant, scale-invariant, and illumination-invariant frequency domain features;

encoding a concatenated set of frequency domain features comprising the set of rotationally-invariant, scale-invariant, and illumination-invariant frequency domain features into a Compressed Spatial Frequency Transform (CSFT) descriptor of the first key patch; and matching a second key patch of a second image to the first key patch of the first image using the CSFT descriptor of the first key patch, wherein the matching comprises using a matching score determined between the CSFT descriptor of the first image and a second image CSFT descriptor.

2. The system of claim 1, wherein the detecting the first key patch is done in a non-linear scale-space.

3. The system of claim 2, wherein the detecting the first key patch is done using a Hessian matrix.

4. The system of claim 3, wherein the Hessian matrix identifies one or more points within the plurality of patches that exceed a pre-determined threshold.

5. The system of claim 1, wherein the set of rotationally-invariant, scale-invariant, and illumination-invariant frequency domain features are generated using a Fourier Transform function.

6. The system of claim 5, wherein the Fourier Transform function is a discrete cosine transformation.

7. The system of claim 1, wherein the set of rotationally-invariant, scale-invariant, and illumination-invariant frequency domain features of the first key patch comprise a set of normalized coefficients determined from the plurality of geometrically transformed patches.

8. The system of claim 1, wherein the plurality of pre-determined angles comprise 0 degrees, 30 degrees, and 60 degrees, wherein one or more additional rotations is computed based on the set of rotationally-invariant, scale-invariant, and illumination-invariant frequency domain features.

9. One or more computer storage media storing computer-executable instructions that, when executed by a processor, cause the processor to perform a method for matching images, the method comprising:

identifying a plurality of patches from a first image, each of the plurality of patches comprising a portion of the first image;

detecting a first key patch from the plurality of patches based on a Hessian matrix;

rotating the first key patch at a plurality of pre-determined angles to generate rotated versions of the first key patch;

scaling the rotated versions of the first key patch to a plurality of scales to generate a set of scaled versions of each rotated version of the first key patch, wherein the rotating and the scaling generates a plurality of geometrically transformed patches of the first key patch;

transforming the plurality of geometrically transformed patches of the first key patch from a spatial domain to a Fourier frequency domain or a Discrete Cosine Transform frequency domain to generate a set of rotationally-invariant, scale-invariant frequency domain features of the first key patch;

normalizing the set of rotationally-invariant, scale-invariant frequency domain features to generate a set of rotationally-invariant, scale-invariant, and illumination-invariant frequency domain features;

encoding a concatenated set of frequency domain features comprising the set of rotationally-invariant, scale-invariant, and illumination-invariant frequency domain features into a Discrete Cosine Transform Feature (DCTF) descriptor of the first key patch; and matching a second key patch of a second image to the first key patch of the first image using the DCTF descriptor of the first key patch, wherein the matching comprises using a matching score determined between the DCTF descriptor of the first key patch of the first image and a second image DCTF descriptor.

10. The media of claim 9, wherein the detecting of the first key patch is done in a non-linear scale-space.

11. The media of claim 10, wherein the Hessian matrix comprises spatial second-order derivatives.

12. The media of claim 11, wherein a matrix detection algorithm identifies one or more points within the plurality of patches that exceed a pre-determined threshold.

13. The media of claim 9, wherein the set of rotationally-invariant, scale-invariant, and illumination-invariant frequency domain features of the first key patch comprises a set of normalized coefficients determined from the plurality of geometrically transformed patches.

14. The media of claim 9, wherein the plurality of pre-determined angles comprise 0 degrees, 30 degrees, and 60 degrees, wherein one or more additional rotations is computed based on the set of rotationally-invariant, scale-invariant, and illumination-invariant frequency domain features.

15. A method for matching images, the method comprising:

identifying a plurality of patches from a first image, each of the plurality of patches comprising a portion of the first image;

detecting a first key patch from the plurality of patches based on a Hessian matrix;

rotating the first key patch at a plurality of pre-determined angles to generate rotated versions of the first key patch;

scaling the rotated versions of the first key patch to a plurality of scales to generate a set of scaled versions of each rotated version of the first key patch, wherein the rotating and the scaling generates a plurality of geometrically transformed patches of the first key patch;

generating a set of transformed patches by transforming the one or more plurality of geometrically transformed patches of the first key patch from a spatial domain to a Fourier frequency domain or a Discrete Cosine Transform frequency domain to generate a set of rotationally-invariant, scale-invariant frequency domain features of the first key patch;

normalizing the set of rotationally-invariant, scale-invariant frequency domain features to generate a set of rotationally-invariant, scale-invariant, and illumination-invariant frequency domain features;

encoding a concatenated set of frequency domain features comprising the set of rotationally-invariant, scale-invariant, and illumination-invariant frequency domain features into a Compressed Spatial Frequency Transform (CSFT) descriptor of the first key patch; and matching a second key patch of a second image to the first key patch of the first image using the CSFT descriptor of the first key patch, wherein the matching comprises using a matching score determined between the CSFT descriptor of the first key patch of the first image and a second image CSFT descriptor.

16. The method of claim 15, wherein the detecting the first key patch is done in a non-linear scale-space.

17. The method of claim 16, wherein a detection response map is computed using the Hessian matrix.

18. The method of claim 17, wherein the Hessian matrix identifies one or more points within the plurality of patches that exceed a pre-determined threshold.

19. The method of claim 15, wherein the plurality of pre-determined angles comprise 0 degrees, 30 degrees, and 60 degrees, wherein one or more additional rotations is computed based on the set of rotationally-invariant, scale-invariant, and illumination-invariant frequency domain features of the first key patch.

20. The method of claim 15, wherein the set of rotationally-invariant, scale-invariant, and illumination-invariant frequency domain features of the first key patch comprises a set of normalized coefficients determined from the plurality of geometrically transformed patches.

* * * * *